(12) United States Patent
Szabó et al.

(10) Patent No.: US 11,252,009 B2
(45) Date of Patent: Feb. 15, 2022

(54) METHODS AND APPARATUS FOR LIFE CYCLE MANAGEMENT IN VIRTUAL NETWORKS

(71) Applicant: Telefonaktiebolaget LM Ericsson (publ), Stockholm (SE)

(72) Inventors: Róbert Szabó, Budapest (HU); Balázs Peter Gerö, Budapest (HU); Dávid Jocha, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/770,664

(22) PCT Filed: Dec. 7, 2018

(86) PCT No.: PCT/EP2018/083950
§ 371 (c)(1),
(2) Date: Jun. 8, 2020

(87) PCT Pub. No.: WO2019/121063
PCT Pub. Date: Jun. 27, 2019

(65) Prior Publication Data
US 2021/0176113 A1   Jun. 10, 2021

Related U.S. Application Data

(60) Provisional application No. 62/609,507, filed on Dec. 22, 2017.

(51) Int. Cl.
*G06F 15/177* (2006.01)
*H04L 12/24* (2006.01)

(52) U.S. Cl.
CPC ........ *H04L 41/044* (2013.01); *H04L 41/5051* (2013.01)

(58) Field of Classification Search
CPC .......................... H04L 41/044; H04L 41/5051
See application file for complete search history.

(56) References Cited

U.S. PATENT DOCUMENTS 10,523,529 B2 * 12/2019 Yu .......................... H04L 41/042
2017/0012898 A1 * 1/2017 Zhu .......................... H04L 45/02
(Continued)

FOREIGN PATENT DOCUMENTS

| WO | 2017 035735 A1 | 3/2017 | |
| WO | WO-2017035735 A1 * | 3/2017 | ......... H04L 41/0806 |
| WO | 2017 144094 A1 | 8/2017 | |

OTHER PUBLICATIONS

ETSI GS NFV 001 v1.1.1; Group Specification; "Network Functions Virtualisation (NFV); Use Cases"—Oct. 2013, 50 pages (Year: 2013) (Supplied by Applicant).*
(Continued)

*Primary Examiner* — Richard G Keehn
(74) *Attorney, Agent, or Firm* — Baker Botts, LLP

(57) ABSTRACT

Embodiments described herein provide methods and apparatus for life cycle management in virtual networks. A method, in a Life Cycle Management, LCM, component in a virtual network, wherein the virtual network comprises a first orchestration layer comprising a first network function virtualisation orchestrator, NFVO, and a second orchestration layer, subordinate to the first orchestration layer, comprising a second NF VO, comprises: receiving a first request, from the first NFVO, to determine a first substitution for a first VNF in a first network service request, wherein the first substitution maps the first network service request onto the second orchestration layer; and responsive to a determination, based on a topology of the second orchestration layer, that the first substitution comprises a second VNF associated with the second NFVO, receiving a second request from the second NFVO to provide a second substitution for the (Continued)

second VNF in a second network service request, wherein the second substitution maps the second network service request onto a third network layer, and the second network service request implements at least part of the first network service request.

26 Claims, 14 Drawing Sheets

(56) References Cited

U.S. PATENT DOCUMENTS

2017/0048165 A1* 2/2017 Yu .......................... H04L 47/82
2018/0191581 A1* 7/2018 Yu ....................... H04L 41/5041

OTHER PUBLICATIONS

ETSI GS NFV 001 v1.1.1; Group Specification; Network Functions Virtualisation (NFV); Use Cases—Oct. 2013.
ETSO GS NFV-IFA 005 v2.1.1; Group Specification; Network Functions Virtualisation (NFV); Management and Orchestration; Or-Vi reference point—Interface and Information Model Specification—Apr. 2016.
ETSI GS NFV-IFA007v2.1.1; Group Specification; Network Functions Virtualisation (NFV); Management and Orchestration; Or-Vnfm reference point—Interface and Information Model Specification—Oct. 2016.
ETSI GS NFV-IFA008 V2.1.1; Group Specification; Network Functions Virtualisation (NFV); Management and Orchestration; Ve-Vnfm reference point—Interface and Information Model Specification—Oct. 2016.
ETSI GS NFV-IFA009v1.1.1; Group Specification; Network Functions Virtualisation (NFV); Management and Orchestration; Report on Architectural Options—Jul. 2016.
ETSI GS NFV-IFA011 V2.1.1; Group Specification; Network Functions Virtualisation (NFV); Management and Orchestration; VNF Packaging Specification—Oct. 2016.
ETSI GS NFV-IFA 013 2.3.1; Group Specification; Network Functions Virtualisation (NFV) Release 2; Management and Orchestration; OS-MA-NFVO reference point—Interface and Information Model Specification—Aug. 2017.
VNFM Development Guide created by Chengli Wang, last modified by Quan Zhong on Nov. 28, 2016; VNFM Development Guide—NFVO-Open-O Wiki—Jan. 4, 2018.
PCT International Search Report issued for International application No. PCT/EP2018/083950—dated Feb. 22, 2019.
Unifying Cloud and Carrier Networks, Deliverable 2.2: Final Architecture (draft), Due date: Oct. 31, 2014 Version date: Nov. 15, 2014; editors: Robert Szabo, Balazs Sonkoly and Mario Kind—Nov. 15, 2014.
PCT Written Opinion of the International Searching Authority issued for International application No. PCT/EP2018/083950—dated Feb. 22, 2019.
ETSI GR NFV-IFA021 v0.9.0; Group Report; Network Functions Virtualisation (NFV); Management and Orchestration Report on management of NFV-MANO and automated deployment of EM and other OSS functions (Sep. 2017)—printed May 29, 2020.
ETSI GR NFV IFA 028 v0.11.0; Group Report; Network Function Virtualisation (NFV); Management and Orchestration Architecture options to support the offering of NFV MANO services across multiple administrative domains (Sep. 2017)—printed May 29, 2020.

* cited by examiner

METHODS AND APPARATUS FOR LIFE CYCLE MANAGEMENT IN VIRTUAL NETWORKS

PRIORITY

This nonprovisional application is a U.S. National Stage Filing under 35 U.S.C. § 371 of International Patent Application Serial No. PCT/EP2018/083950 filed Dec. 7, 2018 and entitled "METHODS AND APPARATUS FOR LIFE CYCLE MANAGEMENT IN VIRTUAL NETWORKS" which claims priority to U.S. Provisional Patent Application No. 62/609,507 filed Dec. 22, 2017 both of which are hereby incorporated by reference in their entirety.

TECHNICAL FIELD

Embodiments described herein relate to methods and apparatus for providing topology aware service component decomposition to implement network service requests in a multi-provider virtual network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

For the purposes of this application European Telecommunications Standards Institute (ETSI) terminology will be used. It will however, be appreciated that equivalent virtual components and procedures may be used. In a virtual environment, a virtual network functions manager (VNFM), or a Lifecycle Management (LCM) component, may provide a virtual network function (VNF) lifecycle management interface to a network function virtualization orchestrator (NFVO). VNF lifecycle management operations may include VNF instantiation, scaling and termination.

A Virtual Infrastructure Manager (VIM) may provide a resource orchestration interface to an NFVO. The resource orchestration interface may allow for operation such as allocating, updating and terminating VNFs. In indirect mode, the VNFM may use the resource orchestration interface provided by the NFVO. In direct mode, the VNFM may talk directly to the VIM instead of the NFVO.

A VNFM (both in direct and indirect mode) may use several VIMs, but it may not be possible to instantiate a VNF whose components are distributed to several VIMs.

NFVOs provide Network Services to the NFVO customers. An orchestration hierarchy may be formed by NFVOs connected in a hierarchical fashion. An NFVO may be split into a Network Service Orchestrator (NSO) and a Resource Orchestrator (RO) component corresponding to lifecycle and resource management respectively.

SUMMARY

The project leading to this application has received funding from the European Union's Horizon 2020 research and innovation programme under grant agreement No. 671636.

According to embodiments described herein there is provided a method, in a Life Cycle Management, LCM, component in a virtual network. The virtual network comprises a first orchestration layer comprising a first network function virtualisation orchestrator, NFVO, and a second orchestration layer, subordinate to the first orchestration layer, comprising a second NFVO. The method comprises receiving a first request, from the first NFVO, to determine a first substitution for a first VNF in a first network service request, wherein the first substitution maps the first network service request onto the second orchestration layer; and responsive to a determination, based on a topology of the second orchestration layer, that the first substitution comprises a second VNF associated with the second NFVO, receiving a second request from the second NFVO to provide a second substitution for the second VNF in a second network service request, wherein the second substitution maps the second network service request onto a third network layer, and the second network service request implements at least part of the first network service request.

According to some embodiments there is provided a method in a first network function virtualisation orchestrator, NFVO. The first NFVO is in a first orchestration layer superior to a second orchestration layer comprising a second NFVO in a virtual network. The method comprises receiving a request to instantiate a first network service comprising a first VNF; and transmitting a first request to a Lifecycle manager, LCM, component to determine a first substitution for the first VNF, wherein the first substitution maps the first network service onto a topology of the second orchestration layer. The method further comprises receiving the first substitution for the first VNF, wherein the first substitution comprises a second VNF associated with the second NFVO; transmitting an indication of the second VNF to the second NFVO; and responsive to receiving an indication that the second NFVO is capable of supporting the second VNF, transmitting a second network service request to the second NFVO to instantiate a second network service comprising the second VNF, wherein the second network service implements at least part of the first network service.

According to some embodiments there is provided a Life Cycle Management, LCM, component in a virtual network. The virtual network comprises a first orchestration layer comprising a first network function virtualisation orchestrator, NFVO, and a second orchestration layer, subordinate to the first orchestration layer, comprising a second NFVO. The LCM component comprises processing circuitry configured to receive a first request, from the first NFVO, to determine a first substitution for a first VNF in a first network service request, wherein the first substitution maps the first network service request onto the second orchestration layer; and responsive to a determination, based on a topology of the second orchestration layer, that the first substitution comprises a second VNF associated with the second NFVO, receive a second request from the second NFVO to provide a second substitution for the second VNF in a second network service request, wherein the second substitution maps the second network service request onto a third network layer, and the second network service request implements at least part of the first network service request.

According to some embodiments there is provided a first network function virtualisation orchestrator, NFVO, in a first orchestration layer superior to a second orchestration layer comprising a second NFVO in a virtual network. The first NFVO comprises processing circuitry configured to receive a request to instantiate a first network service comprising a first VNF; and transmit a first request to a Lifecycle manager, LCM, component to determine a first substitution for the first VNF, wherein the first substitution maps the first network service onto a topology of the second orchestration layer. The processing circuitry is further configured to receive the first substitution for the first VNF, wherein the first substitution comprises a second VNF associated with the second NFVO; transmit an indication of the second VNF to the second NFVO; and responsive to receiving an indication that the second NFVO is capable of supporting the second VNF, transmit a second network service request to the second NFVO to instantiate a second network service comprising the second VNF, wherein the second network service implements at least part of the first network service.

According to some embodiments there is provided a computer program comprising instructions which, when executed on at least one processor, cause the at least one processor to carry out the method as described above.

According to some embodiments there is provided a computer program product comprising a computer-readable medium with the computer program as described above.

The aforementioned embodiments therefore provide methods and apparatus which allow the LCM component by delegated to the subordinate second orchestration layer in order to decompose the virtual network functions onto the topology of the lower network layers. This delegation of the LCM component may ensure that an optimal placement of virtual network functions in the physical infrastructure layer is provided.

DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
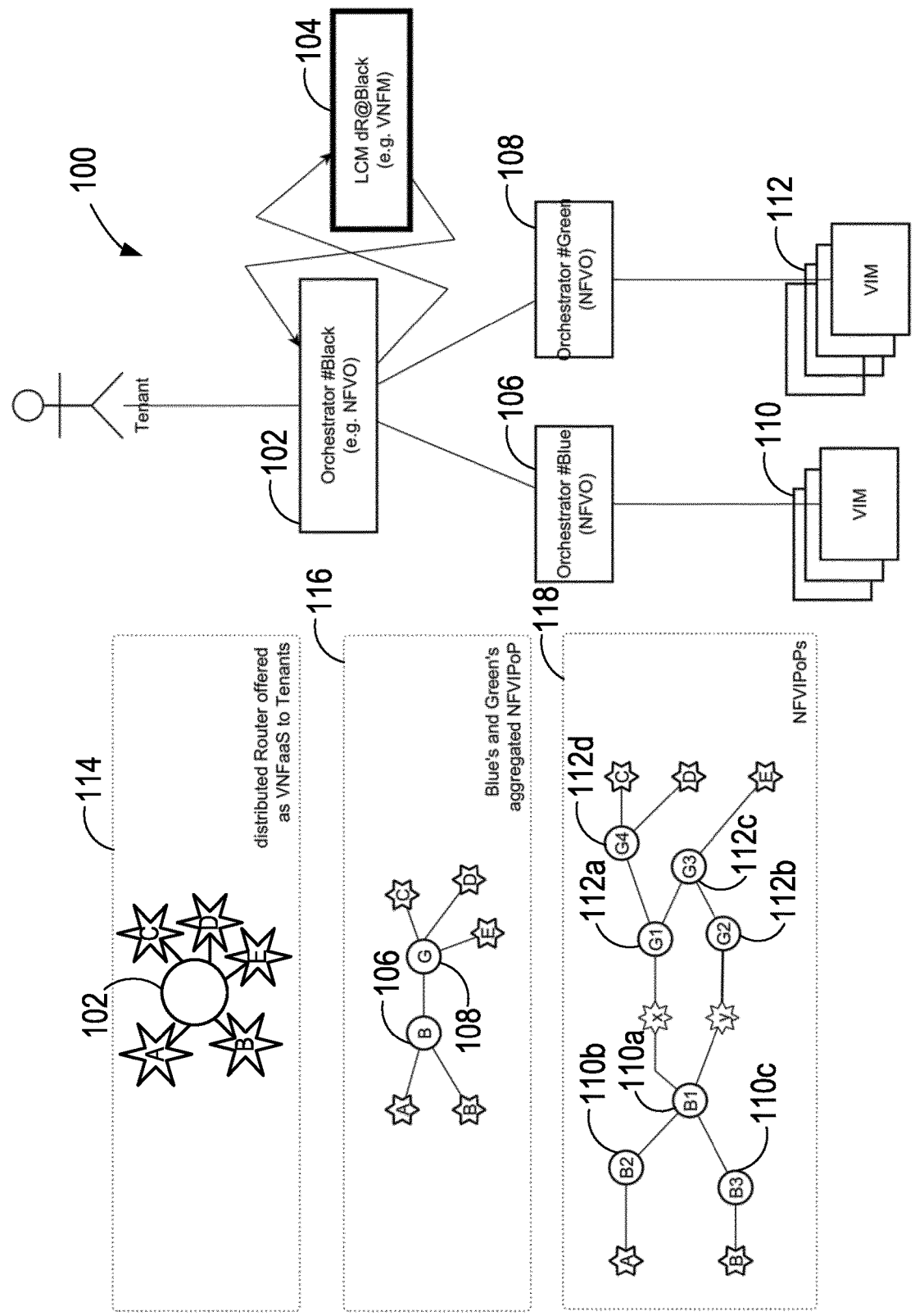
FIG. 1 illustrates an example of a virtualisation network comprising a multi-provider orchestration layer and the example corresponding topology of the network layers.

FIG. 1 illustrates an example of a virtualisation network comprising a multi-provider orchestration layer and the corresponding topology of the network layers. Please note that throughout the application the terms Orchestrator and Network Functions Virtualization Orchestrator (NFVO) are used interchangeably. Similarly the terms Life Cycle Management (LCM) component and Virtual Network Functions Manager (VNFM) are used interchangeably.

Lifecycle Management (LCM) components are registered to an NFVO corresponding to an orchestration layer. For example, a first orchestration layer may comprise a first NFVO (Orchestrator Black) 102. A LCM component 104 may be registered to the first NFVO 102.

In this example, a subordinate network layer to the first orchestration layer comprises a second orchestration layer. The second orchestration layer comprises a second NFVO, (Orchestrator Blue) 106 and a third NFVO (Orchestrator Green) 108. The second and third NFVOs are part of separate autonomous systems (AS) or domains, namely a Blue domain and a Green domain. These domains may be managed by separate network service providers.

In this example, a third network layer, subordinate to the second orchestration layer, comprises a plurality of Virtual Infrastructure Managers (VIMs). Specifically three VIMs 110 are connected to the second NFVO 106 in the Blue domain, and four VIMs 112 are connected to the third NFVO 108 in the Green domain. These VIMs may correspond to a physical infrastructure layer.

The left hand side of FIG. 1 illustrates the topology of each layer as understood by the network layer above. It will be appreciated that, in hierarchies such as the one illustrated in FIG. 1, domain abstractions, for example, hiding the topology, resources and capability details of a network layer below from a network layer above, may be common due to the domain boundaries, scalability and split of concerns.

In this example, each domain has external connection points denoted by stars. A, B, C, D, E are customer endpoints while stars x, y represent inter-domain connection points.

The box 114 illustrates the topology of the first orchestration layer as viewed by a customer requesting a network service from the first NFVO 102. The topology of the first orchestration layer comprises only the first NFVO 102 with the customer A, B, C, D, E connected to the first NFVO 102. In box 114, the endpoints may not necessarily be connected to the distributed router offered at the first NFVO, and it may be a decision of the customer how exactly to use the offered virtual function. In some embodiments, the end points A, B, C, D and E may comprise other VNFs, for example other NFVOs or service provider domains.

A distributed router VNF may comprise a virtual function which is capable of routing communications between end points by using a plurality of router VNFs associated with points of presence in a subordinate network layer.

From the point of view of the customers, also named tenants, the first NFVO may also be regarded as a so-called VNFaaS (Virtual Network Function as a Service).

The topology of the second orchestration layer as seen from the first NFVO 102 is illustrated in box 116. In this topology the first NFVO 102 does not have knowledge of the third network layer and therefore can see a single node 106 representing the second NFVO 106, and a single node 108 representing the third NFVO 108. The topology of the second orchestration layer also comprises the customer end points A and B connected to the second NFVO 106 in the Blue domain, and the customer end points C, D and E connected to the third NFVO 108 in the Green domain.

The topology of the third orchestration layer, as seen from the second NFVO 106 and the third NFVO 108, is illustrated in box 118. In this topology the virtualization domains managed by each of the VIMs in the third network layer are visible. Specifically, the second NFVO 106 can see the topology of the third network layer in the Blue domain. In other words, the second NFVO 106 may see the VIMs 110a, 110b, and 110c and their interconnections with each other and the customer end points A and B. The second NFVO 106 may also see that the topology of the third network layer comprises the inter-domain connection points x and y. Similarly, the third NFVO 108 can see the topology of the third network layer in the Green domain. In other words, the third NFVO 108 can see the VIMs 112a, 112b, 112c and 112d and their interconnections with each other and the customer end points C, D and E. The third NFVO 108 may also see the inter-domain connection points x and y.

Each NFVO may embed network service requests, received from the network layer above, into the topology of the network layer below. In other words, if for example, the second NFVO 106 receives a request from the first NFVO 102 to provide a network service comprising a virtual network function (VNF), the second NFVO must map this VNF onto one of the three available VIMs in the topology of the third network layer.

As described above the LCM component 104 is registered to the first NFVO 102. This LCM component 104 may be able to resolve topological dependencies corresponding to the details regarding the topology of the subordinate layers which are available at the first NFVO 102. In other words, the LCM component 104 may receive information relating to the topology of the second orchestration layer, and may be able to decompose virtual network functions (VNFs) requested in a network service in order to implement the network service in the topology of the second orchestration layer.

However, the LCM component 104 is only aware of the topology of the second orchestration layer as it is connected to the first NFVO. It may therefore not be able to decompose the virtual network function sufficiently for the network function to be optimally implemented in the third orchestration layer.

Figure 2:
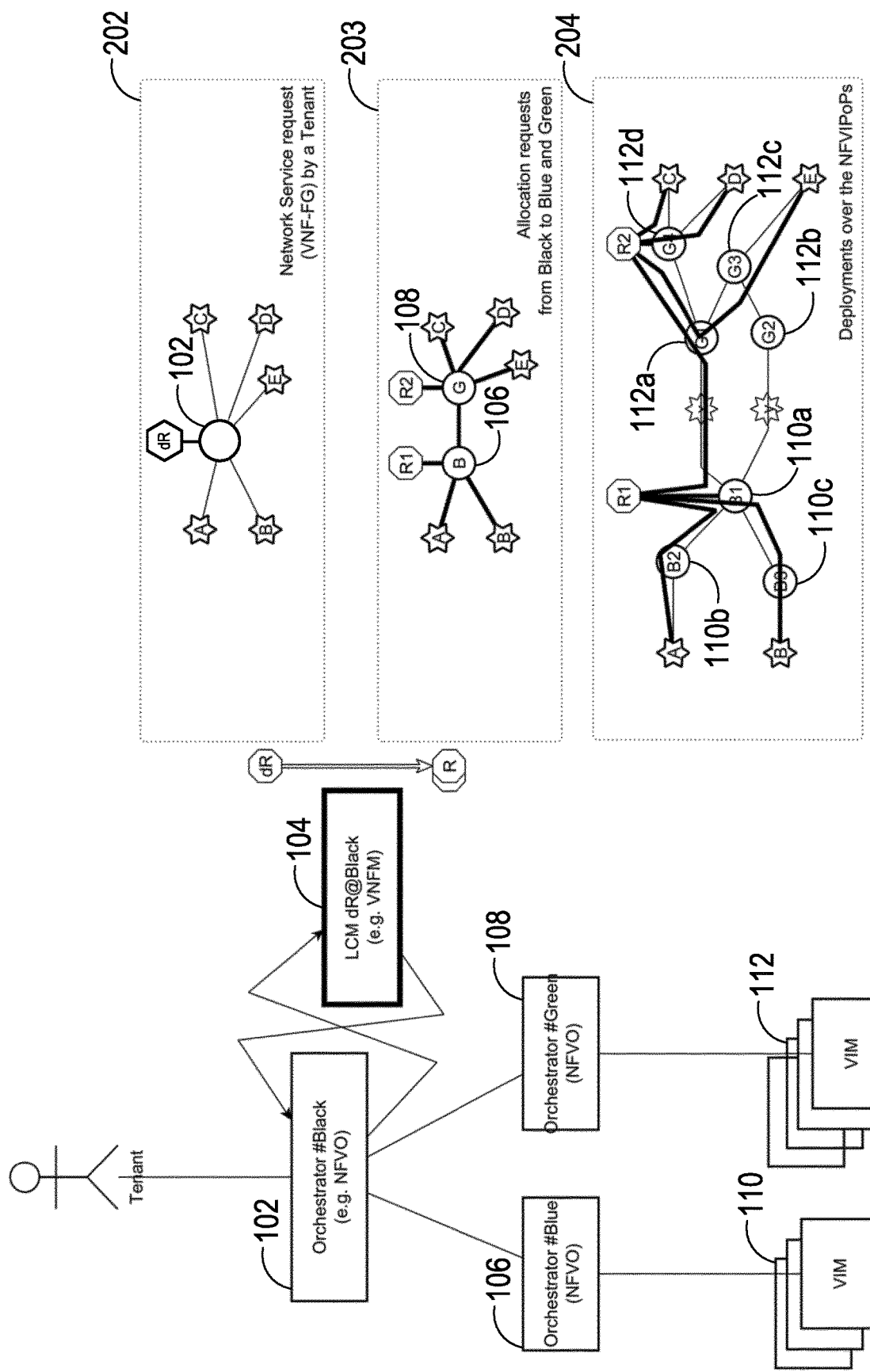
FIG. 2 illustrates an example where the decomposition provided by the LCM component results in a sub-optimal implementation of a network service in a third network layer.

FIG. 2 illustrates an example where the decomposition provided by the LCM component 104 for the first NFVO does not result in an optimal implementation of the network service request in the third network layer.

For example, box 202 illustrates a VNF forwarding graph (VNF-FG) of a first network service request for a distributed router (dR) VNF between the customer end points A, B, C, D and E. The first NFVO 102 may, with the help of the LCM component 104, provide a first substitution for the VNF dR, wherein the first substitution maps the first network service request onto the second orchestration layer. In other words, the LCM component 104, based on the topology of the second orchestration layer, and the request to provide a VNF dR between the customer end points A, B, C, D and E, may determine that the first substitution comprises two separate router VNFs, R1 and R2, as illustrated in box 203. The first substitution may therefore be implemented by as a second service request to the second NFVO 106 for a router VNF, and a third service request to the third NFVO 108 for a router VNF.

Even though the second orchestration layer comprises two NFVOs, as the first NFVO 102 is not aware of the topology of any subordinate layers to the second orchestration layer, it may not provide a first substitution which may require any further decomposition as, in this embodiment, the third NFVO 108 and second NFVO 106 do not have the capability to provide any further VNF substitution.

The second NFVO 106 may therefore receive a second network service request from the first NFVO 102 to provide a router VNF between the customer end points A and B and the Green domain. The second NFVO 106 may therefore embed the router VNF R1 at one of the three VIMs in the Blue domain. Given that the second NFVO 106 has knowledge of the topology of the third network layer, the second NFVO 106 may embed the router VNF R1 at the VIM 110a, as illustrated by the VNF-FG in box 204.

Similarly, the third NFVO 108, may receive a third network service request from the first NFVO 102 to provide a router VNF R2 between the customer end points C, D, and E, and the Blue domain. The third NFVO 108 may therefore embed the router VNF R2 at one of the four VIMs in the Green domain. Given that the third NFVO 108 has knowledge of the topology of the third network layer, the third NFVO 108 may embed the router VNF R2 at the VIM 112d, as illustrated by the VNF-FG in box 204.

However, given the specific topology of the third network layer in this example, this embedding of the router VNF R2 at VIM 112d results in a sub-optimal mapping of the original service request from the customer to the first NFVO 102, as the lack of router VNF at the VIM 112a may prevent traffic from the customer end point E from traveling between the VIMs 112a and 112d. Therefore, the resulting services provided by embedding R1 and R2 may not truly implement a distributed router VNF between the customer end points A, B, C, D and E.

According to some embodiments therefore, the LCM component 104 may be delegated to subordinate orchestration layers of the virtual network, such that decomposition of VNFs may occur in subordinate orchestration layers. The LCM component 104 may therefore oversee the topology aware service (component) decomposition in its local scope, and recursively delegate itself to subordinate orchestrators until the physical infrastructure layer is reached or until no LCM delegation is supported.

Figure 3:
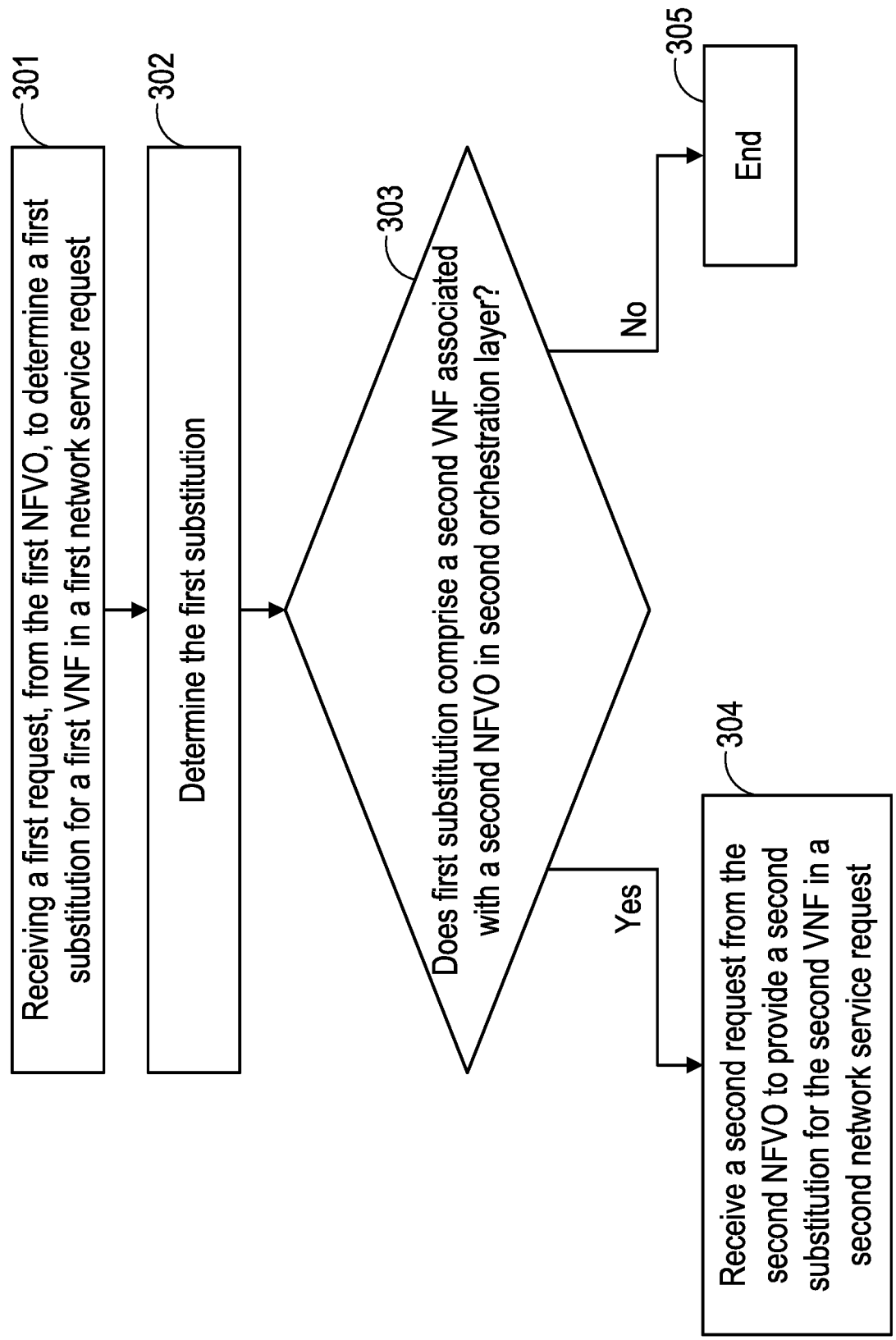
FIG. 3 illustrates a method in a Life Cycle Management, LCM, component in a virtual network according to some embodiments.

FIG. 3 illustrates a method, in a Life Cycle Management, LCM, component in a virtual network according to some embodiments. The virtual network comprises a first orchestration layer comprising a first NFVO 102, and a second orchestration layer, subordinate to the first orchestration layer, comprising a second NFVO 106.

In step 301, the LCM component receives a first request, from the first NFVO, to determine a first substitution for a first VNF in a first network service request, wherein the first substitution maps the first network service request onto the second orchestration layer.

In step 302, the LCM component determines the first substitution. As described previously, the first substitution may be determined based on a topology of the second orchestration layer. However, conversely to as described above with reference to FIG. 2, this first substitution may associate VNFs with the NFVOs in the second orchestration layer that may require further decomposition. For example, the first substitution may associate a distributed router VNF with an NFVO in the second orchestration layer.

In step 303, the LCM component may determine whether the first substitution comprises a second VNF associated with a second NFVO in a second orchestration layer. For example, the first network service request may comprise a distributed router VNF associated with a first NFVO, and a first substitution may comprise a distributed router VNF associated with the second NFVO.

Responsive to a determination in step 303 that the first substitution comprises a second VNF associated with the second NFVO, the method passes to step 304 in which the LCM component receives a second request from the second NFVO to provide a second substitution for the second VNF in a second network service request. The second network service request may be a subclass or reclassification of the first network service request.

The second substitution maps the second network service request onto a third network layer, and the second network service request implements at least part of the first network service request. For example, the first network service request may comprise a first VNF-FG linking a plurality of network end points to the first VNF. The second network service request may therefore comprise a second VNF-FG linking at least two of the plurality of network end points to the second VNF.

Responsive to a determination in step 303 that the first substitution does not comprise a second VNF associated with the second NFVO, the method may end in step 305 as the LCM component may not be required to delegate to any further NFVOs.

Figure 4:
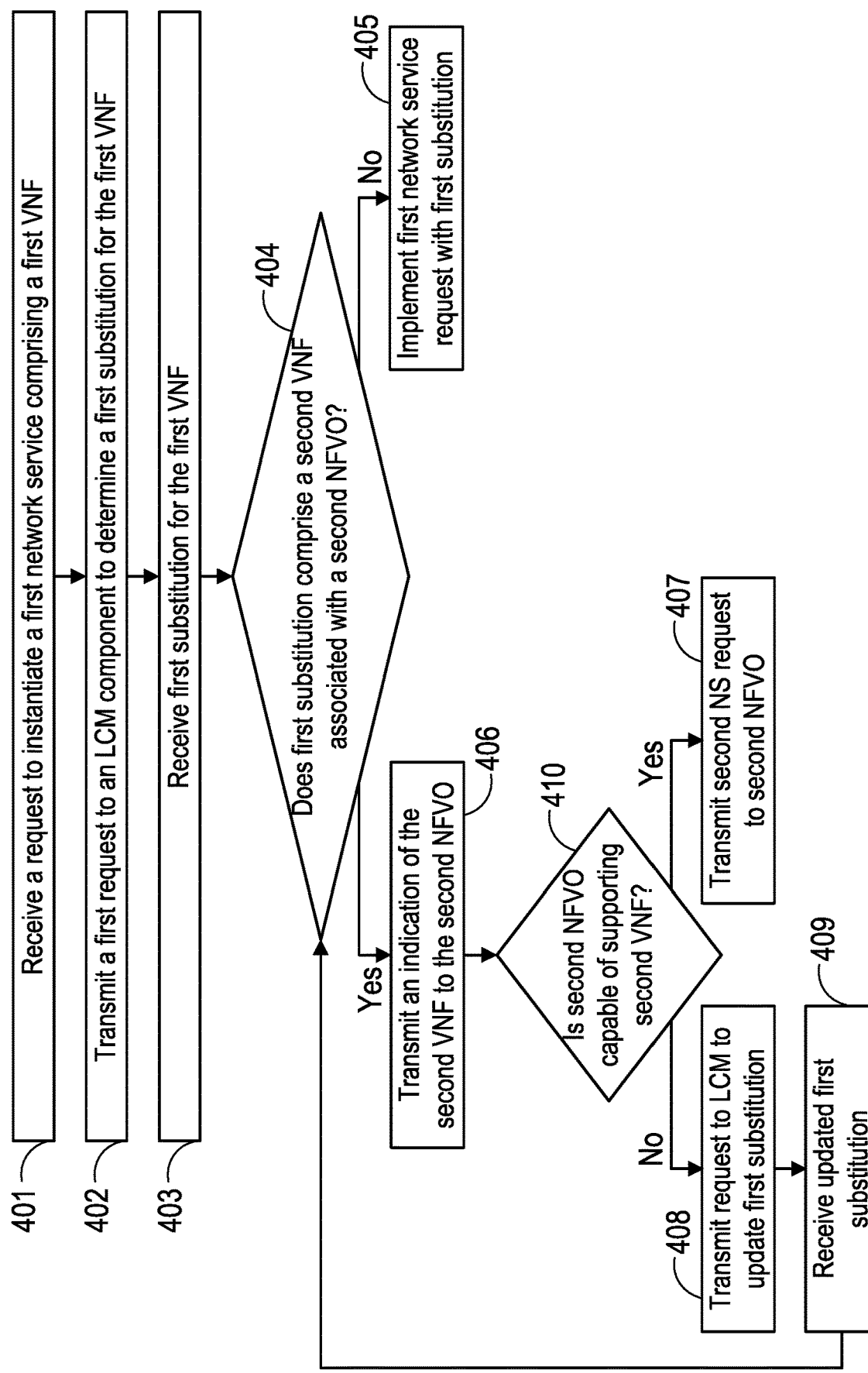
FIG. 4 illustrates a method in a first NFVO according to some embodiments.

FIG. 4 illustrates a method, in a first NFVO according to some embodiments. The first NFVO may be in a first orchestration layer superior to a second orchestration layer comprising a second NFVO in a virtual network.

In step 401, the first NFVO receives a request to instantiate a first network service comprising a first VNF. For example, the first NFVO may be requested to instantiate a first network service comprising a distributed router VNF.

In step 402 the first NFVO transmits a first request to a Lifecycle manager, LCM, component to determine a first substitution for the first VNF, wherein the first substitution maps the first network service onto a topology of the second orchestration layer.

In some embodiments, the first NFVO maps the first VNF to the topology of the second orchestration layer and transmits this as a VNF forwarding graph (VNF-FG) to the LCM component as the first request. The LCM component may then determine the first substitution based on the received VNF-FG. In some embodiments, the LCM component receives the first VNF separately from the topology of the second orchestration layer, and determines the first substitution based on the first VNF and the topology of the second orchestration layer.

In step 403 the first NFVO receives the first substitution from the LCM component.

In step 404, the first NFVO may determine whether the first substitution comprises a second VNF associated with a second NFVO.

If the first substitution does not comprise a second VNF associated with a second NFVO, the method passes to step 405 in which the first NFVO may implement the first network service request using the first substitution.

If the first substitution comprises a second VNF associated with a second NFVO, the method passes to step 406 in which the first NFVO transmits an indication of the second VNF to the second NFVO. This may allow the second NFVO to attempt to register with an LCM component, and to determine whether the second VNF is supported by the NFVO.

The first NFVO may then in step 410 receive an indication of whether the second NFVO is capable of supporting the second VNF. The first NFVO may then determine, based on the indication, whether the second NFVO is capable of supporting the second VNF.

If the second NFVO is capable of supporting the second VNF, the method passes to step 407 in which the first NFVO implements the first network service request using the first substitution. For example, the first NFVO may transmit a second network service request to the second NFVO to instantiate a second network service comprising the second VNF. The second network service may implement at least part of the first network service.

If the second NFVO is not capable of supporting the second VNF, the method passes to step 408 in which the first NFVO may transmit a request to the LCM component to update the first substitution based on the determination that the second NFVO is not capable of supporting the second VNF. The LCM may then be able to update the first substitution based on the reduced capabilities of the second NFVO, and may transmit an updated first substitution to the first NFVO. This updated first substitution may be received by the first NFVO in step 409.

The method may then pass back to step 404. In some embodiments, the method may pass back to step 404 if the updated first substitution comprises a new second VNF associated with a new second NFVO where the capability of the new second NFVO to support the new second VNF has not already be investigated.

Figure 5:
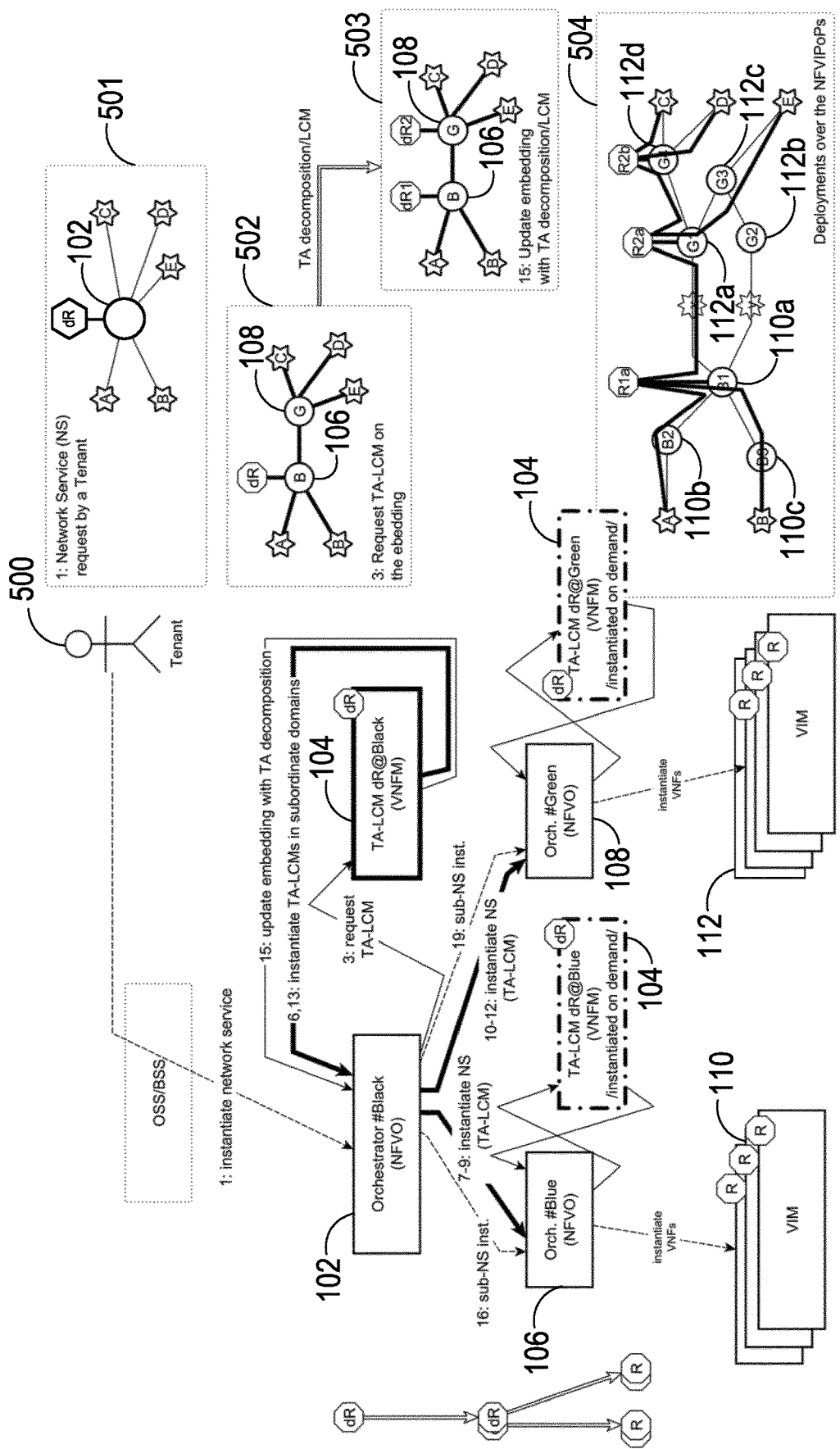
FIG. 5 illustrates an example implementation of the methods illustrated in FIGS. 3 and 4.

Turning to FIG. 5 as an example implementation of the methods illustrated in FIGS. 3 and 4. This example utilises routers and distributed routers as example VNFs. However, it will be appreciated that any type of VNF may be used.

In FIG. 5, a first NFVO 102 receives a request from a customer 500 to instantiate a network service according to the VNF-FG illustrated in box 501. In other words, the first network service comprises a distributed router VNF between the customer end points A, B, C, D and E. As previously mentioned the end points A, B, C, D and E may also represent further VNFs which may for example be part of further service provider network domains. The first NFVO 102 therefore receives the request to instantiate the first network service as described in step 401 of FIG. 4. The first NFVO 102 may then map the first VNF to the topology of the second orchestration layer, which, in this example may result in the VNF-FG illustrated in box 502. In this example, the first NFVO 102 maps the VNF dR to the second NFVO 106 in the second orchestration layer. The first NFVO 102 may then transmit the VNF-FG illustrated in box 502 to the LCM component 104 as the first request to the LCM component 104 to determine the first substitution as in step 402 of FIG. 4.

The LCM component 104 receives the first request from the first NFVO 102 as described in step 301 of FIG. 3. The LCM component 104 may then determine, based on the received VNF-FG, for example as illustrated in box 502, a first substitution (or decomposition) for the VNF dR, as described in step 302 of FIG. 3. In other words, the LCM component 104 may perform a topology aware decomposition of the first VNF onto the topology of the second orchestration layer to provide the first substitution.

In this example, the LCM component 104, may determine that the first substitution comprises a second distributed router VNF dR1 associated with the second NFVO 106, and a third distributed router VNF dR2 associated with the third NFVO 108, as illustrated in the VNF-FG in box 503. It will however, be appreciated that the second orchestration layer may comprise only one orchestrator, and may comprise other components such as VIMs. In these circumstances, the decomposition of the dR onto the second orchestration layer may be different. For example, the first substitution may comprise a single dR VNF associated with an orchestrator in the second orchestration layer, and a router VNF associated with a VIM in the second orchestration layer.

The LCM component 104 may then transmit the first substitution to the first NFVO 102, as described in step 403 of FIG. 4. The first substitution may be transmitted by the LCM component 104 along with a request that the first NFVO 102 instantiate LCM registration at both the second NFVO 106, and the third NFVO 108.

The first NFVO 102 may therefore determine, as in step 404 of FIG. 4, that the first substitution comprises a second VNF, VNF dR1 associated with a second NFVO 106. In this example, the first NFVO 102 determines that the first substitution comprises a third VNF, VNF dR2, associated with a third NFVO 108 in the second orchestration layer.

The first NFVO 102 may then transmit an indication of the second VNF to the second NFVO 106. In other words, the first NFVO 102 may transmit a request to the second NFVO, instructing the second NFVO 106 to both attempt to register with the LCM component 104, and request that the LCM component 104 determine a second substitution for the VNF dR1 in the third network layer. In other words, the first NFVO 102 may instruct the second NFVO 106 to instantiate a topology aware substitution request to LCM component 104.

Similarly, in this example, the first NFVO 102 may transmit an indication of the third VNF dR2, to the third NFVO 108. In other words, the first NFVO 102 may transmit a request to the third NFVO 108 instructing the third NFVO 108 to both attempt to register with the LCM component 104, and to request that the LCM component 104 determine a third substitution for the VNF dR2 in the third network layer. In other words, the first NFVO 102 may instruct the third NFVO 108 to instantiate a topology aware substitution request to LCM component 104.

The second NFVO 106 may therefore transmit a second request to the LCM component 104 to provide a second substitution for the second VNF dR1 in the third network layer, as described in step 304 of FIG. 3. The LCM component 104 may then determine, from the topology of the third network layer, in particular the topology of the third network layer in the Blue domain, that the second substitution comprises the router VNF R1a associated with the VIM 110a. As this second substitution does not comprise a VNF associated with a NFVO, the LCM may not need to delegate to any further subordinate layers of the network. It will be appreciated however, that the third network layer may in some embodiments comprise a further orchestration layer comprising for example a fourth NFVO. In this example, the second substitution may comprise a fourth VNF associated with the fourth NFVO, and therefore the second NFVO 106 may transmit an indication of the fourth VNF to the fourth NFVO, instructing the fourth NFVO to attempt to register with the LCM component 104 similarly to above.

In this example, therefore, the LCM component may transmit the second substitution to the second VFNO 106.

The third NFVO 108 may also transmit a request to the LCM component 104 to provide a third substitution for the third VNF dR2 in the third network layer. The LCM component 104 may then determine, from the topology of the third network layer, in particular the topology of the third network layer in the Green domain, that the third substitution comprises a router VNF R2a associated with the VIM 112a, and a router VNF R2b associated with the VIM 112d. Similarly to above, as this third substitution does not comprise a VNF associated with a NFVO, the LCM does not need to delegate to any further subordinate layers of the network.

The LCM component 104 may therefore transmit the third substitution to the third VFNO 108.

The LCM component 104 may then alert the first NFVO 102 that the delegation through the network has been completed, and that the first substitution may be used to implement the network service request from the customer 500. The first NFVO 102 may then transmit a second service request to the second NFVO 106 to provide the VNF dR1 between the customer end points A and B and the Green domain. The first NFVO 102 may also transmit a third service request to the third NFVO 108 to provide the VNF dR2 between the customer end points C, D and E and the Blue Domain.

The second NFVO 106 may then use the second substitution, received from the LCM component 104 to implement the second service request using the router VNF R1a at VIM 110a. The third NFVO 108 may then use the third substitution received from the LCM component 104, to implement the third service request using the router VNFs R2a at VIM 112a, and R2b a at VIM 112d.

Therefore, by delegating the LCM component 104 to the subordinate second orchestration layer to decompose the requested VNFs onto the topology of the lower layers, the LCM component 104 may ensure that an optimal placement of VNFs in the physical infrastructure layer is provided.

In other words, in contrast to the example illustrated in FIG. 2, the delegation of the LCM component 104 ensures that a second router is placed in the Green domain in the third network layer, thereby providing an optimal decomposition of the distributed router service request form the customer 500.

Figure 6A:
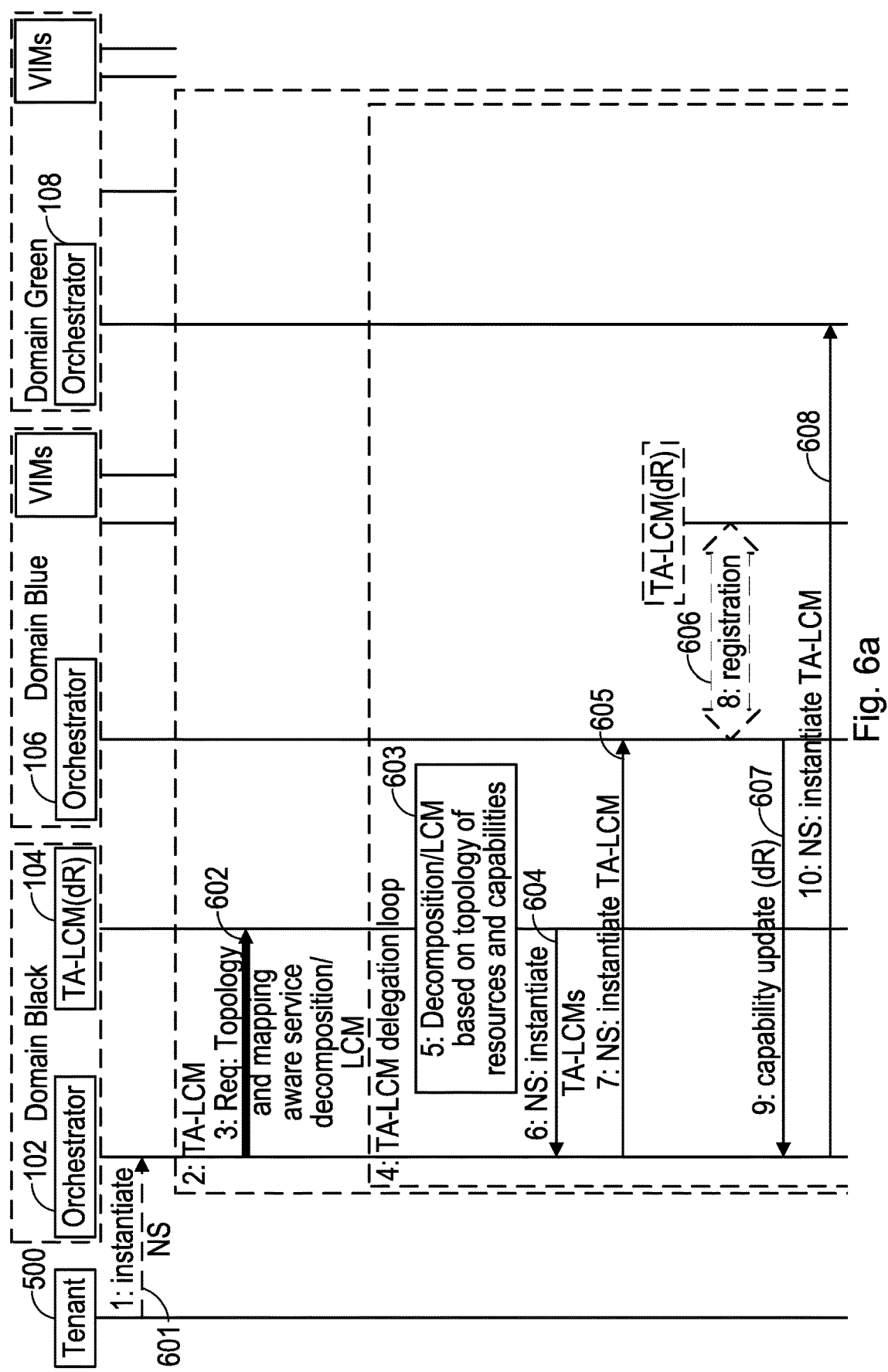
FIG. 6 illustrates an example of signaling between a customer, a first NFVO, an LCM component, a second NFVO, and a third NFVO to implement VNFs at VIMs associated with a physical infrastructure layer.
Figure 6B:
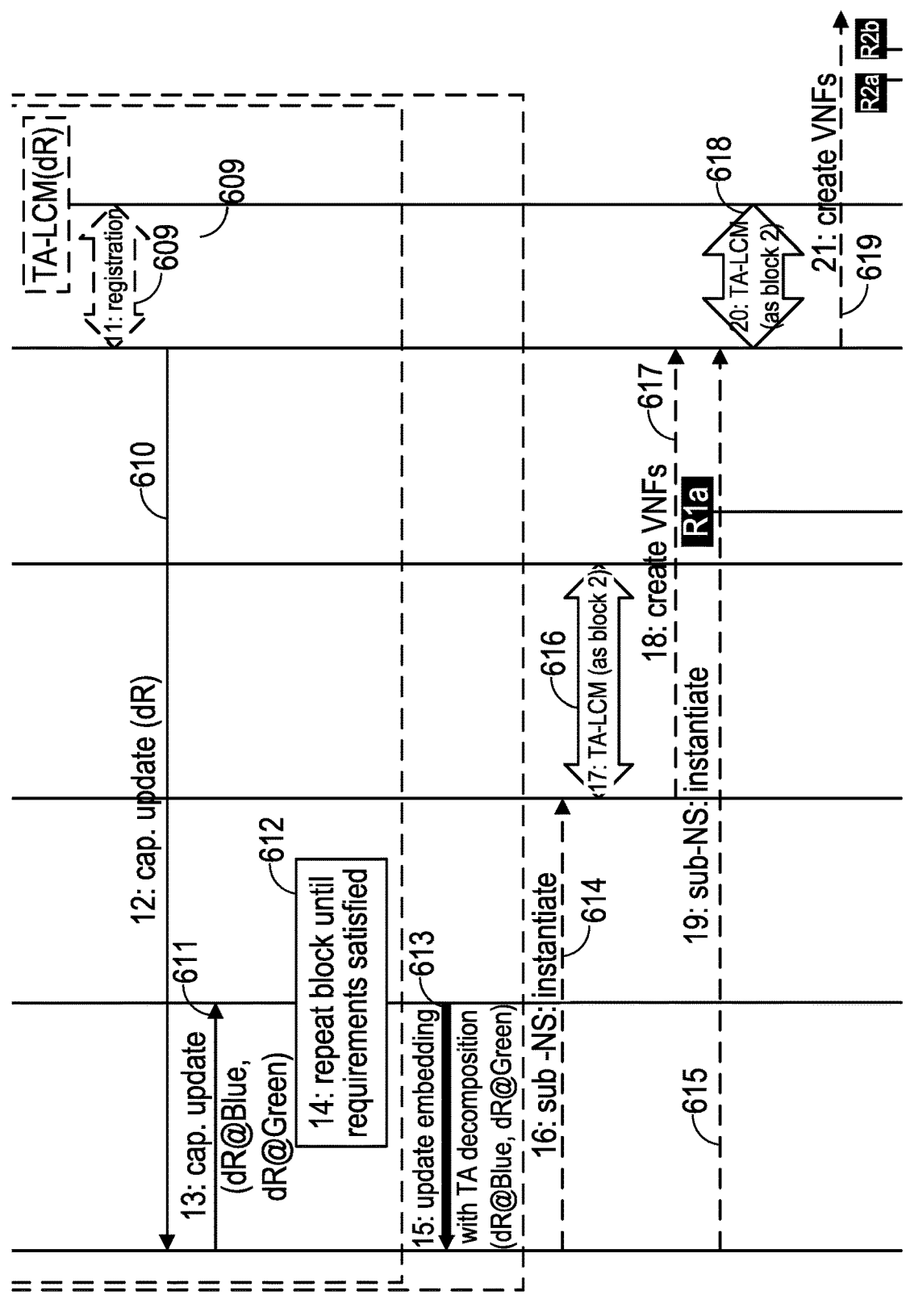

FIG. 6 illustrates an example of signaling between the customer 500, the first NFVO 102, the LCM component 104, the second NFVO 106, and the third NFVO 108 to implement the VNFs at the VIMs associated with a physical infrastructure layer. This figure is split in FIGS. 6a and 6b which form part of the same signaling diagram.

In step 601, the customer 500 transmits a request to the first NFVO 102 to instantiate a first network service (NS). For example, the first network service request may be the network service request illustrated in box 501 of FIG. 5. The first network service request may comprise a VNF at the first NFVO 102 which may require decomposing for implementation in the subordinate orchestration layer.

In step 602 the first NFVO 102 transmits a first request to a Lifecycle manager, LCM, component 104 to determine a first substitution for the first VNF. As previously described this first request may comprise an VNF-FG as illustrated in box 502 of FIG. 5.

In particular, the first request shown to the LCM component 104 can be limited to expose only the topology related to the embedded service request and not any components of the subordinate network layer which do not form part of the network service request.

In step 603 the LCM component 104 determines the first substitution based on the topology of the second orchestration layer. In this example, the first substitution comprises the VNF-FG illustrates in box 503 of FIG. 5.

In step 604, the LCM component 104 transmits the first substitution to the first NFVO 102. The first NFVO 102 may then instruct the second NFVO 106 to request a substitution for the second VNF dR1 from the LCM component 104 in step 605. This may require the second NFVO 106 to register with the LCM component 104 in step 606. In some embodiments however, for example where a particular network service request is used frequently, the second NFVO 106 may previously have registered with the LCM component 104.

In step 607 the second NFVO 106 may indicate to the first NFVO 102 whether it is capable of supporting the second VNF. In some examples, as will be illustrated in FIG. 7, an NFVO may not be capable of supporting a VNF. This may be due to missing resources or incompatibly in the capabilities show to the LCM component. Alternatively, the LCM registration may fail.

Steps 608 to 610 correspond to steps 605 to 607 but for the third NFVO 108 rather than the second NFVO 106. In some examples, steps 608 to 610 may be performing concurrently with steps 605 to 607. Once the first NFVO 102 has received confirmation from both the second NFVO 106 and the third NFVO 108 that they are capable of supporting the second VNF and third VNF respectively, the first NFVO 102 may report this capability to the LCM component 104 in step 611. The above process may be repeated in 612 until all capabilities for the first substitution have been satisfied.

The LCM component 104 may then transmit an indication to the first NFVO 102 to implement the first network service request according to the first substitution in step 613.

The first NFVO 102 may then implement the first network service request by transmitting a second network service request to the second NFVO 106 in step 614, and by transmitting a third network service request to the third NFVO 108 in step 615. The second network service request may comprise a request to implement the second VNF, and the third network service request may comprise a request to implement the third VNF.

In step 616, the second NFVO 106 may then perform steps 602 to 613 with the LCM component 104. For the example of FIG. 5, the topology of the third network layer comprises no NFVOs, and therefore steps 604 to 611 may not occur. It will however, be appreciated, that in some embodiments, the third network layer may comprise at least one NFVO, and therefore these steps may occur.

At the end of step 616, the second NFVO receives an indication from the LCM component 104 to implement the second network service request according to the second substitution. The second NFVO 106 may therefore implement the second network service request in step 617. In this example, the second substitution comprises a router VNF R1a as illustrates in box 504 and therefore the second NFVO 106 creates the R1a VNF at the VIM 110a.

Similarly, in step 618, the third NFVO 108 may perform steps 602 to 613 with the LCM component. For the example of FIG. 5, the topology of the third network layer comprises no NFVOs, and therefore steps 604 to 611 may not occur. It will however, be appreciated, that in some embodiments, the third network layer may comprise at least one NFVO, and therefore these steps may occur.

At the end of step 616, the third NFVO 108 receives an indication from the LCM component 104 to implement the third network service request according to the third substitution. The third NFVO 108 therefore implements the third network service request in step 619. In this example, the third substitution comprises routers VNF R2a and VNF R2b as illustrated in box 504 of FIG. 5, and therefore the second NFVO 106 creates the R2a VNF at VIM 112a and the R2b VNF at VIM 112d.

Figure 7A:
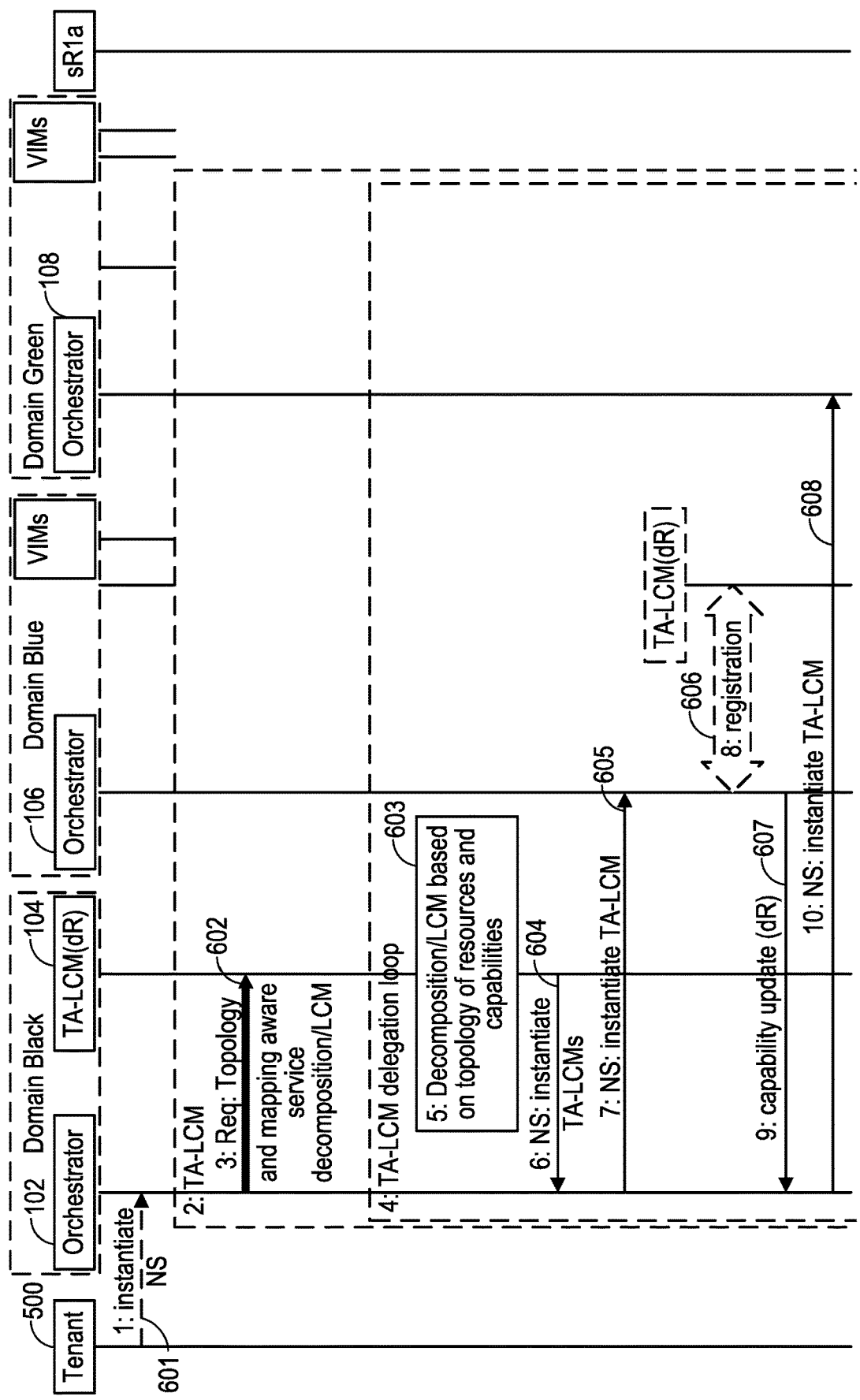
FIG. 7 illustrates an example of the signaling when a NFVO is not capable of supporting a VNF.
Figure 7B:
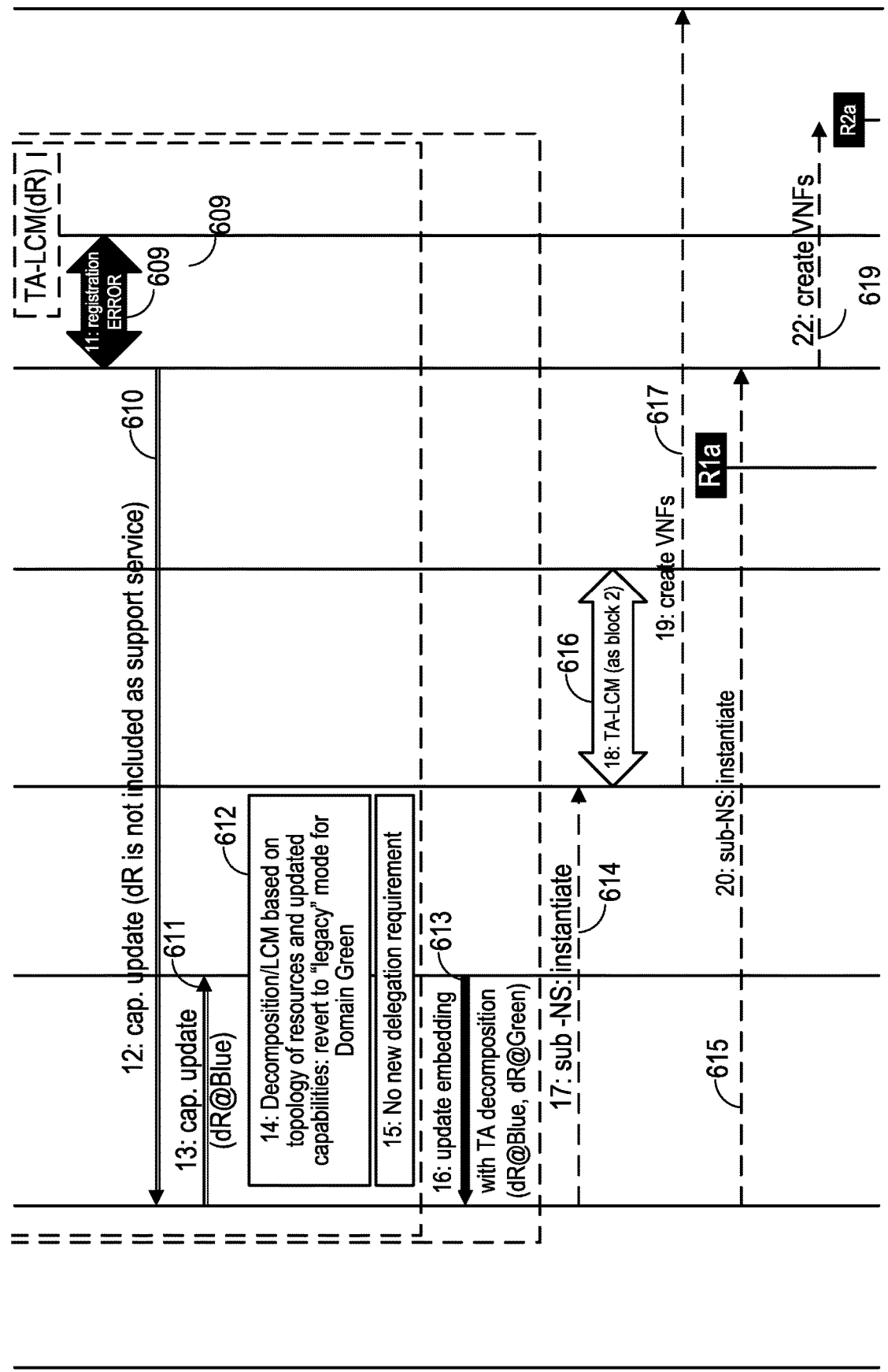

FIG. 7 illustrates an example of the signaling when a NFVO is not capable of supporting a VNF. This figure is split in FIGS. 7a and 7b which form part of the same signaling diagram.

In this example, at step 609, an error occurs in the registration with the LCM component 104. For example, the third NFVO 108 may have missing resources or incompatibly with the capabilities shown to the LCM component 104. Alternatively, the LCM registration may fail.

In response to this, the third NFVO 108 may indicate to the first NFVO 102 that it is not capable of supporting the third VNF, in step 610.

The first NFVO, responsive to receiving the indication that the third NFVO 108 does not support the third VNF may transmit a request, in step 611, to the LCM component 104 to update the first substitution based on the indication that the third NFVO 108 does not support the third VNF.

In this example, therefore, when the method reaches step 612, the capabilities of the first substitution are not yet satisfied.

The LCM component 104 may therefore update the first substitution based on the determination that the third NFVO 108 does not support the third VNF; and transmit the updated first substitution to the first NFVO 106.

In some examples, this may require the LCM component 104 to delegate to a new NFVO, or to re-delegate to the second NFVO 106, to determine whether a VNF in the updated first substitution is supported.

In this example, the updated substitution does not require any further delegation and therefore the LCM component 104 transmits the updated first substitution to the first NFVO 102. In this example, the updated substitution comprises a dR associated with the second NFVO 106 and a router R associated with the third NFVO 108.

Therefore, when the first NFVO transmits a third network service request to the third NFVO 108 in step 615, the third network service request may in this embodiment comprise a router VNF R, instead of a distributed router VNF dR as in FIG. 6.

The third NFVO will then embed this router VNF R into the topology of the third network layer without requesting a substitution from the LCM component 104, which may result in a sub-optimal embedding.

Figure 8A:
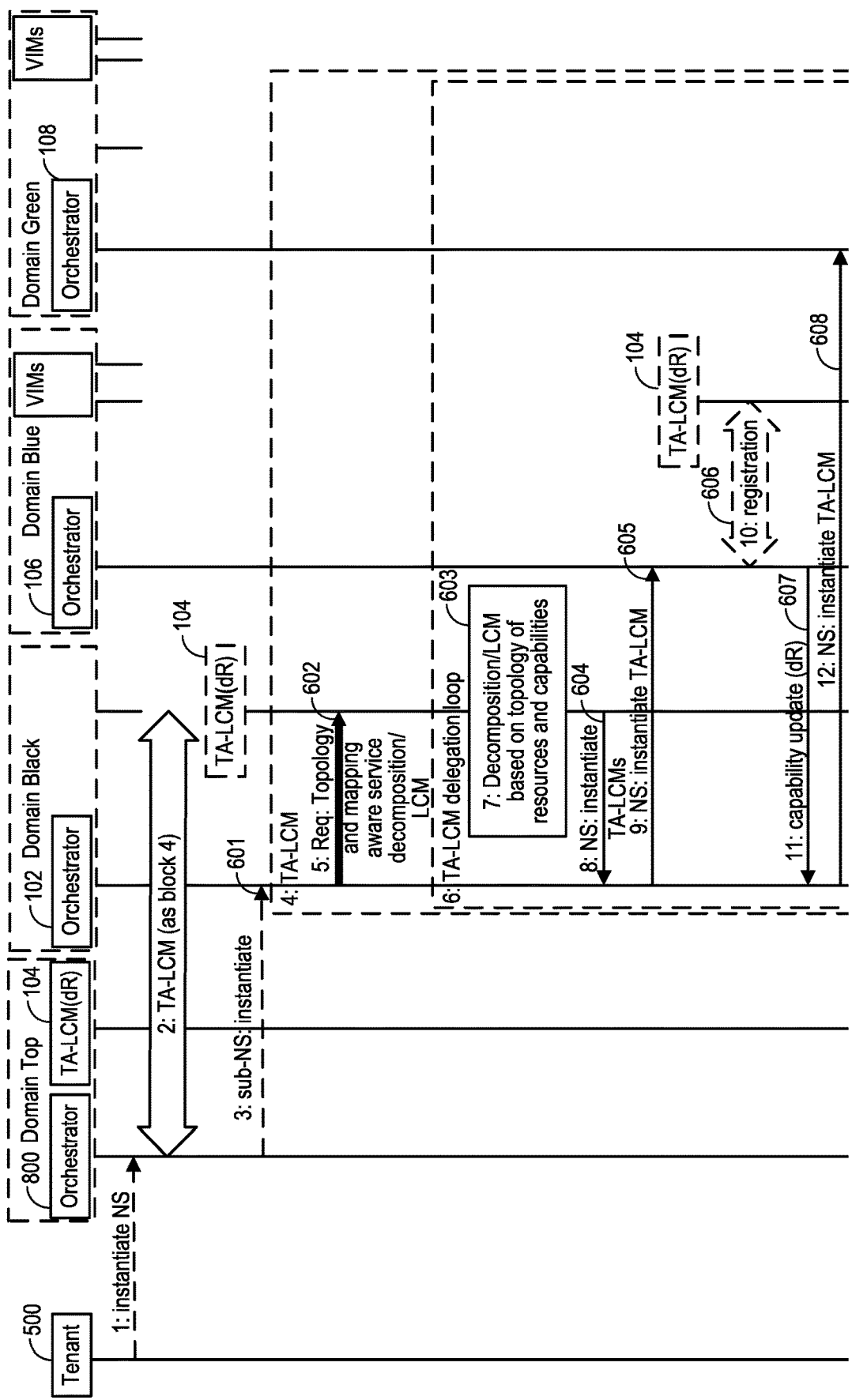
FIG. 8 illustrates an example where a first network service request is received at the first NFVO from a higher orchestration layer.
Figure 8B:
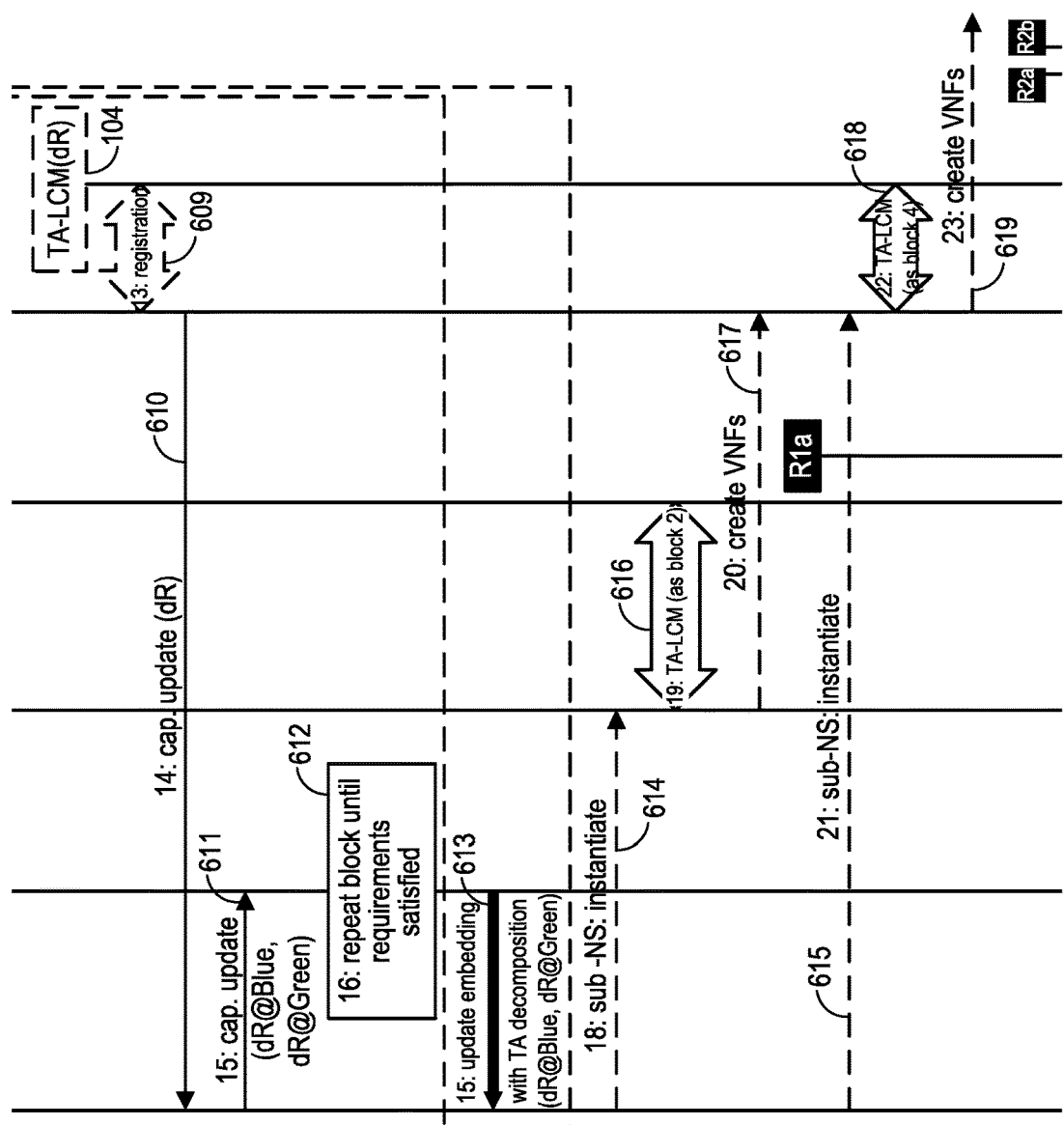

It will also be appreciated that in some embodiments, the first network service request is received at the first NFVO from a higher orchestration layer, rather than a customer end point, as illustrated in FIG. 8. This figure is split in FIGS. 8a and 8b which form part of the same signaling diagram. In this figure a fourth NFVO 800 occupies a fourth orchestration layer which is superior to the first orchestration layer in the network hierarchy. Regardless of this, the first NFVO performs the same method upon receiving the first network service request in step 601. In this embodiment however, the first network service request may have resulted from a decomposition performed by the LCM component 104 in the further orchestration layer.

Figure 9:
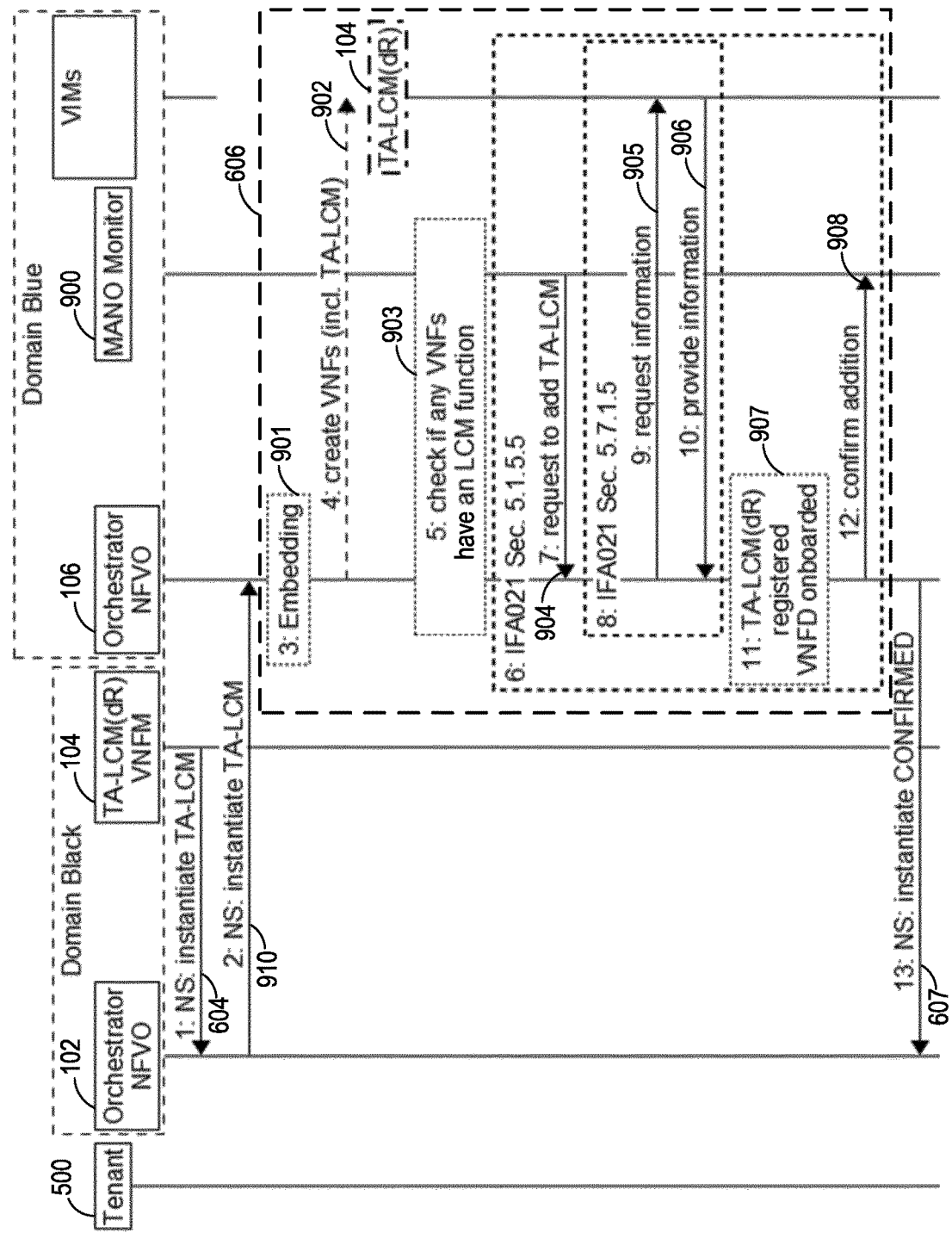
FIG. 9 illustrates an example of a registration process which may be performed in steps 606 and 609 of FIGS. 6, 7 and 8.

FIG. 9 illustrates an example of a registration process which may be performed in steps 606 and 609 of FIGS. 6, 7 and 8. It will however, be appreciated that other LCM component registration mechanisms may be used.

The second NFVO 106 receives in step 909 an instruction from the first NFVO 102 to instantiate the LCM component 104.

The second NFVO 106 may then embed the LCM component 104 into the topology of the third orchestration layer to find an appropriate VIM in the third network layer to host the LCM functionality, in step 901.

The second NFVO may then create any appropriate VNFs including any VNFs for providing LCM functionality, in step 902. In some embodiments, an Element Management interface to the LCM component 104 function could be added, which enables configuration of the LCM logic. For example, it may be that only a bare LCM engine is instantiated in the subordinate layer and the LCM "templates" are configured via the EM interface. An upper layer LCM component 104 may act as an EM for the subordinate domains.

In step 903 the second NFVO 106 and a Management and Orchestration (MANO) Monitor 900 associated with the second NFVO may check whether any VNFs comprise an LCM component to receive the delegated LCM component 104, if not the registration to the LCM component 104 may fail. However, if a VNF does have the required LCM functionality, the method may pass to step 904 in which the MANO requests that the second NFVO 106 requests registration with the LCM component 104.

To do this, the second NFVO 106 may therefore request information from the LCM component 104 in step 905, and may receive the information in step 906. The LCM component 104 may then be considered to be registered with the second NFVO 106 in step 907. The second NFVO 106 may then confirm the registration of the LCM component 104 with the MANO 900 in step 908.

As the registration in therefore complete, the second NFVO may confirm its capabilities to the first NFVO in step 607 as described in FIGS. 6, 7 and 8.

Figure 10:
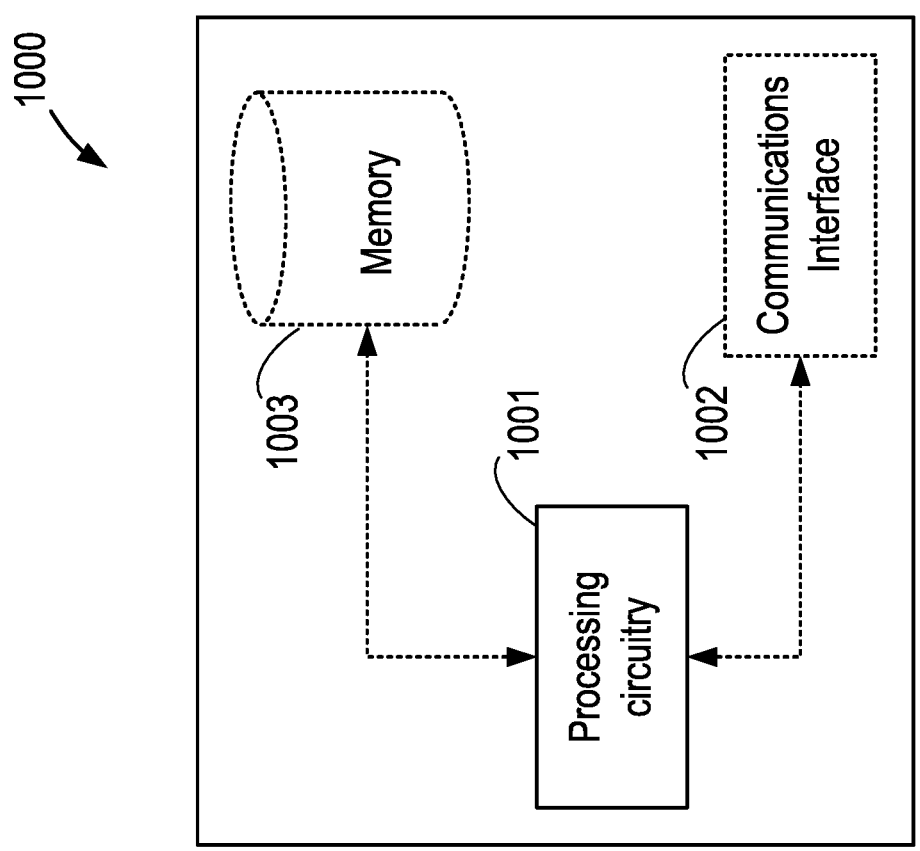
FIG. 10 illustrates an example of an NFVO according to some embodiments.

FIG. 10 illustrates a network functions virtualisation orchestrator (NFVO) 1000 comprising processing circuitry (or logic) 1001. The processing circuitry 1001 controls the operation of the first network functions virtualisation orchestrator (NFVO) 1000 and can implement the method described herein in relation to a network functions virtualisation orchestrator (NFVO) 1000. The processing circuitry 1001 can comprise one or more processors, processing units, multi-core processors or modules that are configured or programmed to control the network functions virtualisation orchestrator (NFVO) 1000 in the manner described herein. In particular implementations, the processing circuitry 1001 can comprise a plurality of software and/or hardware modules that are each configured to perform, or are for performing, individual or multiple steps of the method described herein in relation to the network functions virtualisation orchestrator (NFVO) 1000.

Briefly, the processing circuitry 1001 of the network functions virtualisation orchestrator (NFVO) 1000 is configured to receive a request to instantiate a first network service comprising a first VNF; transmit a first request to a Lifecycle manager, LCM, component to determine a first substitution for the first VNF, wherein the first substitution maps the first network service onto a topology of the second orchestration layer; receive the first substitution for the first VNF, wherein the first substitution comprises a second VNF associated with the second NFVO; transmit an indication of the second VNF to the second NFVO; and responsive to receiving an indication that the second NFVO is capable of supporting the second VNF, transmit a second network service request to the second NFVO to instantiate a second network service comprising the second VNF, wherein the second network service implements at least part of the first network service.

In some embodiments, the network functions virtualisation orchestrator (NFVO) 1000 may optionally comprise a communications interface 1002. The communications interface 1002 of the network functions virtualisation orchestrator (NFVO) 1000 can be for use in communicating with other nodes, such as other virtual nodes. For example, the communications interface 1002 of the network functions virtualisation orchestrator (NFVO) 1000 can be configured to transmit to and/or receive from other nodes requests, resources, information, data, signals, or similar. The processing circuitry 1001 of the network functions virtualisation orchestrator (NFVO) 1000 may be configured to control the communications interface 1002 of the network functions virtualisation orchestrator (NFVO) 1000 to transmit to and/or receive from other nodes requests, resources, information, data, signals, or similar.

Optionally, the network functions virtualisation orchestrator (NFVO) 1000 may comprise a memory 1003. In some embodiments, the memory 1003 of the network functions virtualisation orchestrator (NFVO) 1000 can be configured to store program code that can be executed by the processing circuitry 1001 of the network functions virtualisation orchestrator (NFVO) 1000 to perform the method described herein in relation to the network functions virtualisation orchestrator (NFVO) 1000. Alternatively or in addition, the memory 1003 of the network functions virtualisation orchestrator (NFVO) 1000, can be configured to store any requests, resources, information, data, signals, or similar that are described herein. The processing circuitry 1001 of the network functions virtualisation orchestrator (NFVO) 1000 may be configured to control the memory 1003 of the network functions virtualisation orchestrator (NFVO) 1000 to store any requests, resources, information, data, signals, or similar that are described herein.

Figure 11:
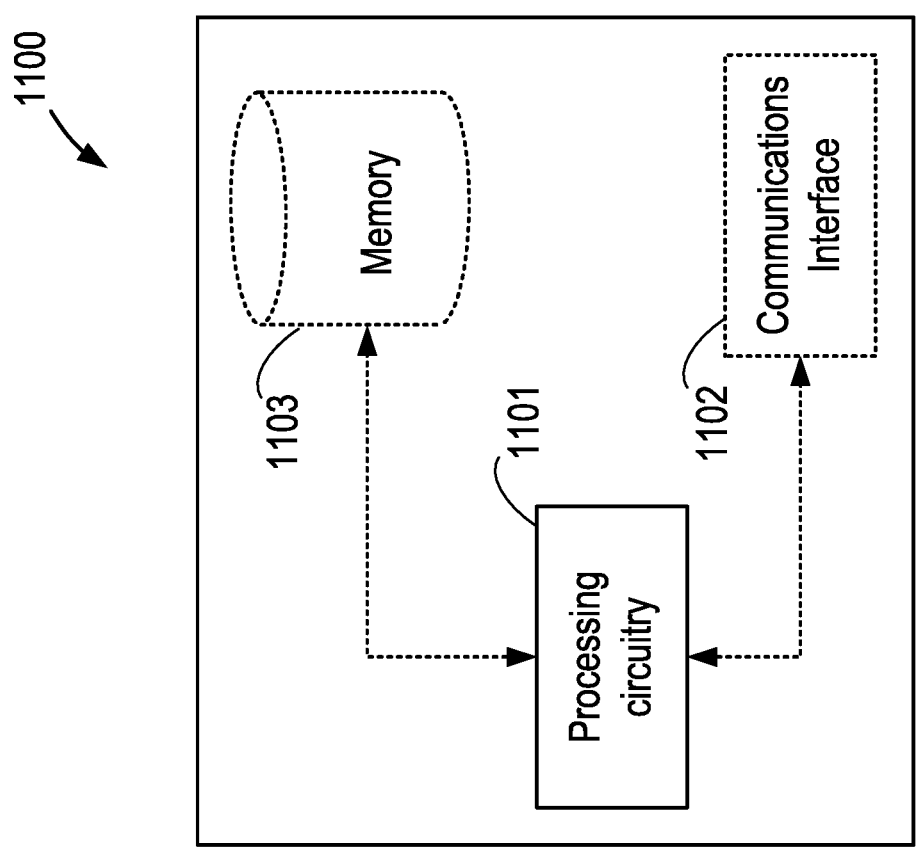
FIG. 11 illustrates an example of a LCM component according to some embodiments.

FIG. 11 illustrates a Lifecycle Management (LCM) component 1100 comprising processing circuitry (or logic) 1101. The processing circuitry 1101 controls the operation of the Lifecycle Management (LCM) component 1100 and can implement the method described herein in relation to a Lifecycle Management (LCM) component 1100. The processing circuitry 1101 can comprise one or more processors, processing units, multi-core processors or modules that are configured or programmed to control the Lifecycle Management (LCM) component 1100 in the manner described herein. In particular implementations, the processing circuitry 1101 can comprise a plurality of software and/or hardware modules that are each configured to perform, or are for performing, individual or multiple steps of the method described herein in relation to the Lifecycle Management (LCM) component 1100.

Briefly, the processing circuitry 1101 of the Lifecycle Management (LCM) component 1100 is configured to receiving a first request, from a first NFVO, to determine a first substitution for a first VNF in a first network service request, wherein the first substitution maps the first network service request onto the second orchestration layer; responsive to a determination, based on a topology of the second orchestration layer, that the first substitution comprises a second VNF associated with a second NFVO, receiving a second request from the second NFVO to provide a second substitution for the second VNF in a second network service request, wherein the second substitution maps the second network service request onto a third network layer, and the second network service request implements at least part of the first network service request.

In some embodiments, the Lifecycle Management (LCM) component 1100 may optionally comprise a communications interface 1102. The communications interface 1102 of the Lifecycle Management (LCM) component 1100 can be for use in communicating with other nodes, such as other virtual nodes. For example, the communications interface 1102 of the Lifecycle Management (LCM) component 1100 can be configured to transmit to and/or receive from other nodes requests, resources, information, data, signals, or similar. The processing circuitry 1101 of the Lifecycle Management (LCM) component 1100 may be configured to control the communications interface 1102 of the Lifecycle Management (LCM) component 1100 to transmit to and/or receive from other nodes requests, resources, information, data, signals, or similar.

Optionally, the Lifecycle Management (LCM) component 1100 may comprise a memory 1103. In some embodiments, the memory 1103 of the Lifecycle Management (LCM) component 1100 can be configured to store program code that can be executed by the processing circuitry 1101 of the Lifecycle Management (LCM) component 1100 to perform the method described herein in relation to the Lifecycle Management (LCM) component 1100. Alternatively or in addition, the memory 1103 of the Lifecycle Management (LCM) component 1100, can be configured to store any requests, resources, information, data, signals, or similar that are described herein. The processing circuitry 1101 of the Lifecycle Management (LCM) component 1100 may be configured to control the memory 1103 of the Lifecycle Management (LCM) component 1100 to store any requests, resources, information, data, signals, or similar that are described herein.

There is therefore provided methods and apparatus for providing delegation of an LCM component 104 to subordinate layers of a network hierarchy, thereby ensuring that optimal implementations of network service requests received at the higher levels of the network are provided.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

The invention claimed is:

1. A method, in a Life Cycle Management, LCM, component in a virtual network, wherein the virtual network comprises a first orchestration layer comprising a first network function virtualisation orchestrator, NFVO, and a second orchestration layer, subordinate to the first orchestration layer, comprising a second NFVO, the method comprising:
receiving a first request, from the first NFVO, to determine a first substitution for a first VNF in a first network service request, wherein the first substitution maps the first network service request onto the second orchestration layer; and
responsive to a determination, based on a topology of the second orchestration layer, that the first substitution comprises a second VNF associated with the second NFVO, receiving a second request from the second NFVO to provide a second substitution for the second VNF in a second network service request, wherein the second substitution maps the second network service request onto a third network layer, and the second network service request implements at least part of the first network service request.

2. The method as in claim 1, wherein the third network layer comprises a physical infrastructure layer, and wherein the method further comprises:
determining, based on a topology of the physical infrastructure layer, that the second substitution comprises one or more VNFs each associated with respective components of the topology of the physical infrastructure layer.

3. The method of claim 1, further comprising:
responsive to the determination that the first substitution comprises the second VNF, registering the second NFVO with the LCM component before receiving the second request from the second NFVO.

4. The method of claim 1, further comprising responsive to a determination that the first substitution comprises a third VNF associated with a third NFVO in the second orchestration layer, attempting to register the third NFVO with the LCM component to determine whether the third NFVO supports the third VNF.

5. The method as in claim 4, further comprising responsive a determination that the third NFVO does not support the third VNF, updating the first substitution based on the determination that the third NFVO does not support the third VNF; and
transmitting the updated first substitution to the first NFVO.

6. The method of claim 1, wherein the first VNF comprises a first distributed router; and
the first network service request comprises a first VNF forwarding graph linking a plurality of network end points to the first distributed router.

7. The method of claim 1, wherein the second VNF comprises a second distributed router and wherein the second network service request comprises a second VNF forwarding graph linking at least two of the plurality of network end points to the second distributed router.

8. A method in a first network function virtualisation orchestrator, NFVO, in a first orchestration layer superior to a second orchestration layer comprising a second NFVO in a virtual network, the method comprising:
receiving a request to instantiate a first network service comprising a first VNF;
transmitting a first request to a Lifecycle manager, LCM, component to determine a first substitution for the first VNF, wherein the first substitution maps the first network service onto a topology of the second orchestration layer;
receiving the first substitution for the first VNF, wherein the first substitution comprises a second VNF associated with the second NFVO;
transmitting an indication of the second VNF to the second NFVO; and
responsive to receiving an indication that the second NFVO is capable of supporting the second VNF, transmitting a second network service request to the second NFVO to instantiate a second network service comprising the second VNF, wherein the second network service implements at least part of the first network service.

9. The method as in claim 8, further comprises:
mapping the first VNF to the topology of the second orchestration layer; and
transmitting the mapped first VNF as the substitution request.

10. The method as in claim 8, wherein the first substitution further comprises a third VNF associated with a third NFVO in the second orchestration layer.

11. The method as in claim 10, further comprising transmitting an indication of the third VNF to the third NFVO.

12. The method as in claim 11, further comprising responsive to receiving an indication that the third NFVO does not support the third VNF:
transmitting a request to the LCM component to update the first substitution based on the indication that the third NFVO does not support the third VNF; and
receiving an updated first substitution.

13. The method of claim 8, further comprising implementing the first network service request according to the first substitution.

14. A Life Cycle Management, LCM, component in a virtual network, wherein the virtual network comprises a first orchestration layer comprising a first network function virtualisation orchestrator, NFVO, and a second orchestration layer, subordinate to the first orchestration layer, comprising a second NFVO, the LCM component comprising processing circuitry configured to:
receive a first request, from the first NFVO, to determine a first substitution for a first VNF in a first network service request, wherein the first substitution maps the first network service request onto the second orchestration layer; and
responsive to a determination, based on a topology of the second orchestration layer, that the first substitution comprises a second VNF associated with the second NFVO, receive a second request from the second NFVO to provide a second substitution for the second VNF in a second network service request, wherein the second substitution maps the second network service request onto a third network layer, and the second network service request implements at least part of the first network service request.

15. The LCM component as in claim 14, wherein the third network layer comprises a physical infrastructure layer, and wherein the processing circuitry is further configured to determine, based on a topology of the physical infrastructure layer, that the second substitution comprises one or more VNFs each associated with respective components of the topology of the physical infrastructure layer.

16. The LCM component of claim 14, wherein the processing circuitry is further configured to responsive to the determination that the first substitution comprises the second VNF, register the second NFVO with the LCM component before receiving the second request from the second NFVO.

17. The LCM component of claim 14, wherein the processing circuitry is further configured to responsive to a determination that the first substitution comprises a third VNF associated with a third NFVO in the second orchestration layer, attempt to register the third NFVO with the LCM component to determine whether the third NFVO supports the third VNF.

18. The LCM component as in claim 17, wherein the processing circuitry is further configured to:
responsive a determination that the third NFVO does not support the third VNF, update the first substitution based on the determination that the third NFVO does not support the third VNF; and
transmit the updated first substitution to the first NFVO.

19. The LCM component of claim 14, wherein the first VNF comprises a first distributed router; and
the first network service request comprises a first VNF forwarding graph linking a plurality of network end points to the first distributed router.

20. The LCM component of claim 14, wherein the second VNF comprises a second distributed router and wherein the second network service request comprises a second VNF forwarding graph linking at least two of the plurality of network end points to the second distributed router.

21. A first network function virtualisation orchestrator, NFVO, in a first orchestration layer superior to a second orchestration layer comprising a second NFVO in a virtual network, the first NFVO comprising processing circuitry configured to:
receive a request to instantiate a first network service comprising a first VNF;
transmit a first request to a Lifecycle manager, LCM, component to determine a first substitution for the first VNF, wherein the first substitution maps the first network service onto a topology of the second orchestration layer;
receive the first substitution for the first VNF, wherein the first substitution comprises a second VNF associated with the second NFVO;
transmit an indication of the second VNF to the second NFVO; and
responsive to receiving an indication that the second NFVO is capable of supporting the second VNF, transmit a second network service request to the second NFVO to instantiate a second network service comprising the second VNF, wherein the second network service implements at least part of the first network service.

22. The first NFVO as in claim 21, wherein the processing circuitry is further configured to:
map the first VNF to the topology of the second orchestration layer; and
transmit the mapped first VNF as the substitution request.

23. The first NFVO as in claim 21, wherein the first substitution further comprises a third VNF associated with a third NFVO in the second orchestration layer.

24. The first NFVO as in claim 23, wherein the processing circuitry is further configured to transmit an indication of the third VNF to the third NFVO.

25. The first NFVO as in claim 24, wherein the processing circuitry is further configured to responsive to receiving an indication that the third NFVO does not support the third VNF:
transmit a request to the LCM component to update the first substitution based on the indication that the third NFVO does not support the third VNF; and
receiving an updated first substitution.

26. The first NFVO of claim 21, wherein the processing circuitry is further configured to implement the first network service request according to the first substitution.

* * * * *